Oct. 1, 1957     R. E. HOUSEHOLDER     2,807,920
TOOL HOLDER
Filed Sept. 13, 1954     2 Sheets-Sheet 1
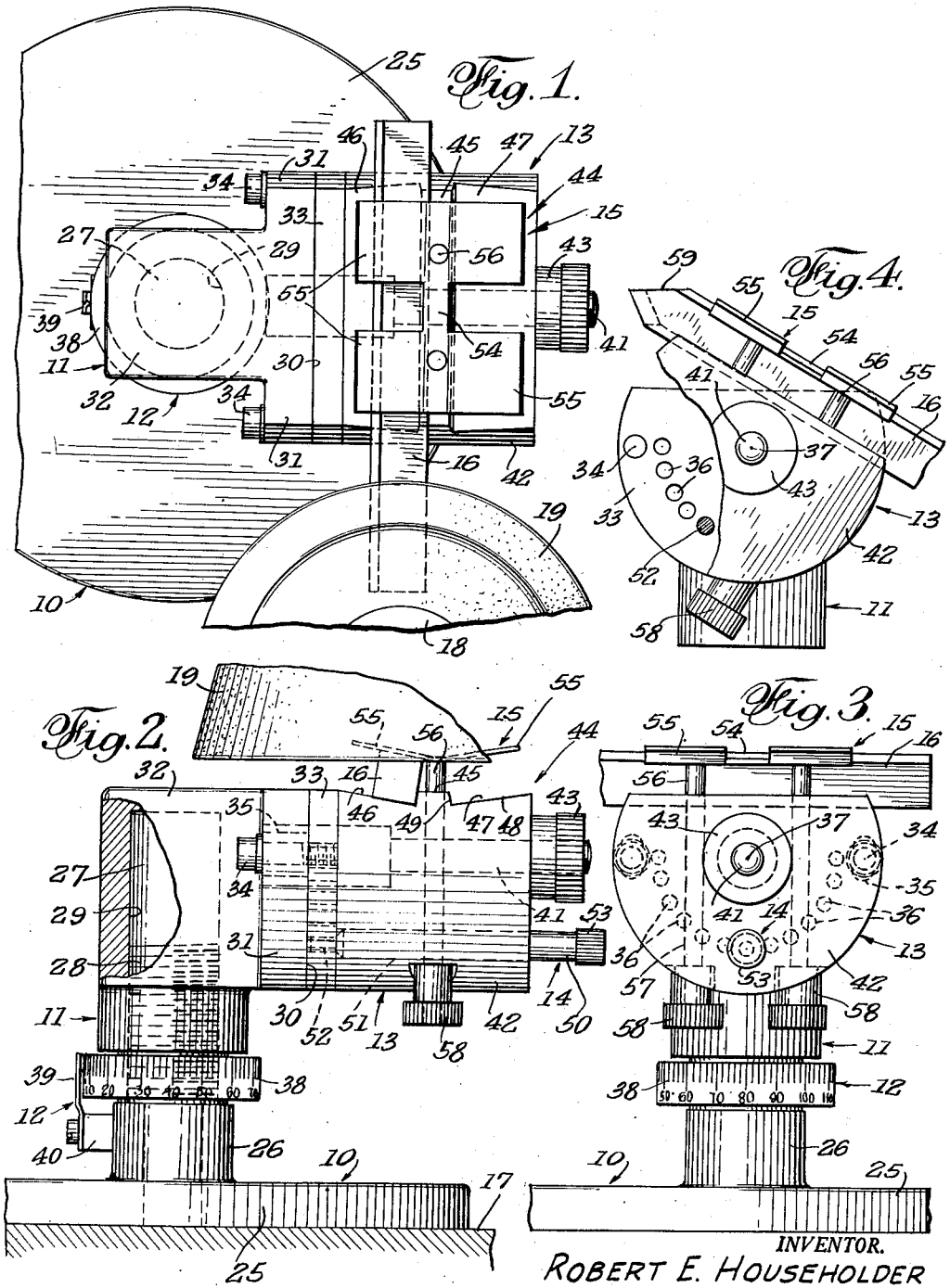
INVENTOR.
ROBERT E. HOUSEHOLDER
BY C. F. Stratton
ATTORNEY Oct. 1, 1957 R. E. HOUSEHOLDER 2,807,920
TOOL HOLDER
Filed Sept. 13, 1954 2 Sheets-Sheet 2
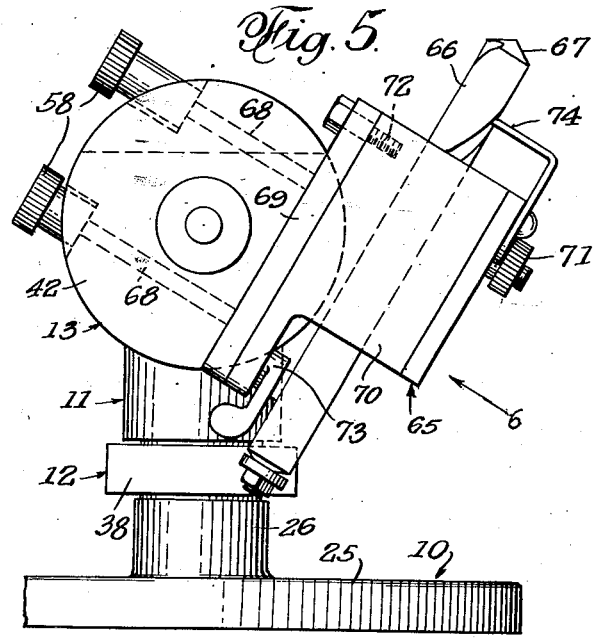
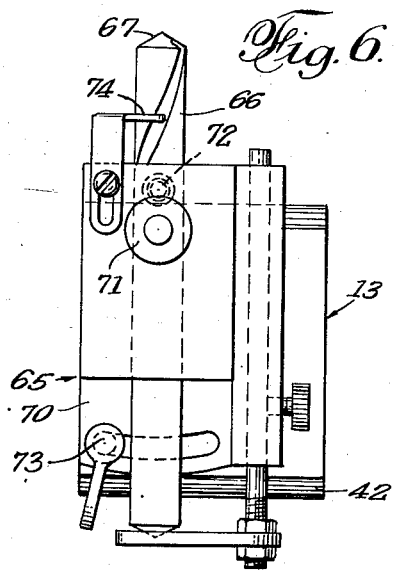
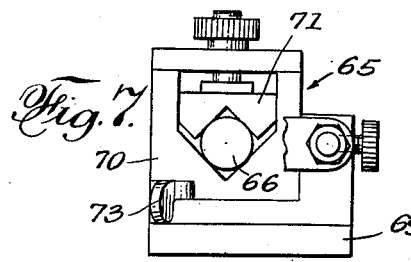
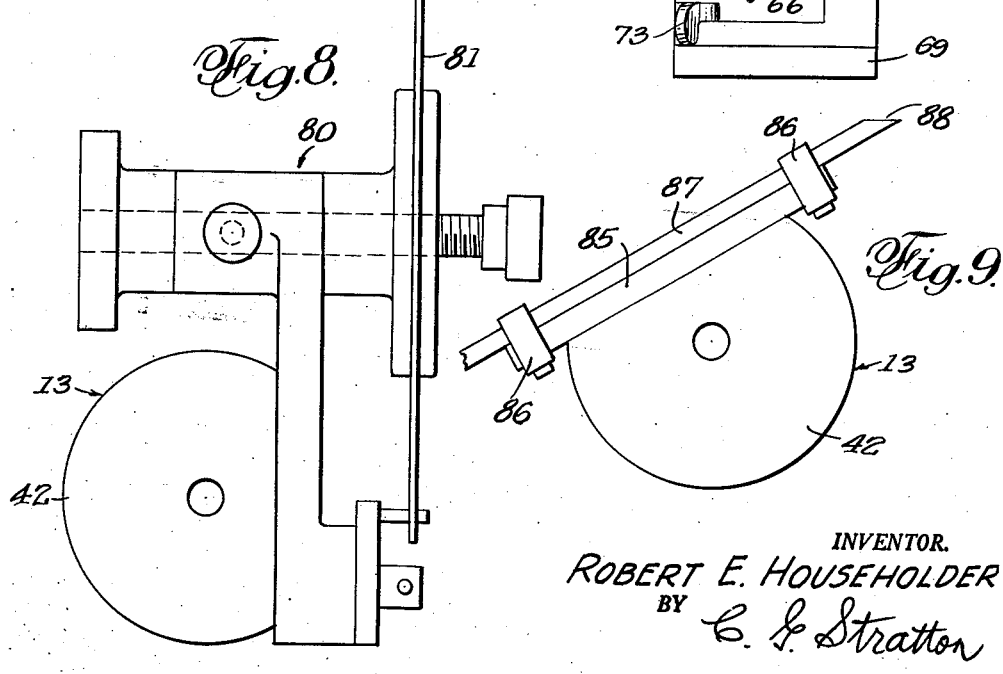
INVENTOR.
ROBERT E. HOUSEHOLDER
BY C. F. Stratton
ATTORNEY United States Patent Office 2,807,920
Patented Oct. 1, 1957

2,807,920

TOOL HOLDER

Robert E. Householder, Inglewood, Calif.

Application September 13, 1954, Serial No. 455,703

12 Claims. (Cl. 51—220)

This invention relates to a tool holder and deals more particularly with a device to hold tools, etc. to have machining operations performed thereon. Still more specifically, the present holder is adapted for use in connection with a drill press or like machine to hold tools in position to be ground at various angles, as desired. It is an object of this invention to provide a tool holder of the character above indicated.

Another object of the invention is to provide a tool-holding device in which tools or articles of various shapes are adapted to be presented, as desired, to a machining or grinding tool. Thus, time-consuming and difficult calculations as to a compound angle of dress of a tool bit, for instance, may easily be resolved by simple setting of the device.

Another object of the invention is to provide a tool holder, as indicated, that has universal adjustment so that the same can readily be used on a drill press where only the grinding tool need be moved with relation to the work or tool carried by the holder.

In the machining of screws having threads of various form, the character of the thread is produced by tools having cutting ends formed according to the form of the thread. When such tools wear, it is necessary to re-dress them, as by grinding, to restore their proper contour. Even an expert mechanic cannot re-dress a tool without aid as to angle of presentation to a grinding wheel. The same is true when sharpening the cutting end of a twist drill, dressing tool bits of various form and for a variety of purposes, grinding or sharpening boring bars, etc. The present invention provides a simple, universally adjustable tool holder that enables using a drill press to grind tools, tool bits, drills, boring bars, etc.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration or example only.

In the drawings, like reference characters designate similar parts in the several views.

Fig. 1 is a broken top plan view of a tool holder embodying a preferred form of the present invention.

Fig. 2 is a broken side elevational view thereof.

Fig. 3 is a broken front view.

Fig. 4 is a broken front view of the tool-holding means of said holder in another position.

Fig. 5 is a broken side elevational view of a modification.

Fig. 6 is an elevational view taken in the direction of arrow 6 of Fig. 5.

Fig. 7 is a bottom view of the mechanism shown in Fig. 6.

Fig. 8 is a front view of the head of the present holder mounting modified means to hold a disc or circular saw in position to be operated on.

Fig. 9 is a similar view of said head mounting a hand tool, such as a chisel, in position to be sharpened.

The tool holder that is illustrated comprises, generally, a base 10, a swivel 11 mounted on said base, means 12 to adjust the swivel toward and from the plane or support on which the holder is disposed, a head 13 carried by said swivel, means 14 to locate the head with respect to the swivel in a desired angular position of the former, and means 15 to removably affix a tool or piece of work 16 on said head.

As can be seen from Fig. 2, the above generally described tool holder is adapted to be positioned on the table 17, as of a drill press, and, as also seen in Fig. 1, the chuck 18 of said press is provided with a grinding wheel 19 preferably in the form of a cup.

The base 10 is shown as a flat base plate 25 that is provided with a central hub or boss 26 from which vertically extends a post or standard 27 that is provided with screw threads 28 in the portion thereof adjacent said hub or boss. The standard 27 is shown as passing through a bore in said hub and should be secured thereto by any suitable means such as a key or a bolt. The bottom face of base plate 25 is machined flat and smooth to have proper sliding engagement on the smooth upper face of the drill press table 17. The post 27 is cylindrical and is advantageously made of hard steel such as drill rod.

The swivel 11 is shown as a casting provided with a bore 29 that fits over standard 27 and, therefore, has both rotational and up and down movement relative to the base 10. Parallel to the axis of said bore, the swivel is provided with a flat machined laterally directed face 30 on a flanged enlargement 31 of the body part 32 in which the bore 29 is formed. A hardened steel face or index plate 33 is mounted against face 30 and is fastened in position as by screws 34 that pass through slots 35 in said flanged enlargement and are engaged by tapped threads in said face plate.

The slots 35 enable rotational adjustment of the index plate to accurately position the indexing apertures 36 therein relative to the bottom machine surface of base plate 25. While the apertures 36 may be placed on any desired angular spacing, the same are arranged in circular form around the axial center 37 of plate 33 with the fifteen apertures that are shown spaced on each side of the lower central or zero aperture as follows: 14½°, 30°, 45°, 60°, 75½°, and 90°. The zero, 30°, 45°, 60°, and 90° apertures are at normal angles much used in machining, while the 14½° and 75½° apertures are usable in connection with the machining of tools that cut Acme threads which include an angle of 29°.

The mentioned slots 35 also enable adjustment of the plate 33 to any angular position around axis 37 and restoration to the related position above mentioned. Thus, the index plate may be turned on its axis to obtain any desired angular adjustment of the head 13.

The means 12 is shown as an adjusting nut 38 threadedly engaged with the threads 28 of standard 27 and the same is held in adjustment by a click spring 39 affixed, as at 40, to the hub 26 of base 10. The end of said spring makes engagement with the grooves on said nut 38, which grooves correspond to a micrometer adjustment, as indicated by the numbers shown on said nut in the drawing. Thus, nut 38 may be adjusted up and down with respect to the base, and as the swivel 11 is supported by said nut, it is adjusted vertically accordingly. Since the swivel 11 is free to turn or swivel on the standard 27, it may be turned to bring a tool into engagement with the grinding wheel 19, as will be described below.

The head 13, in front view, is preferably given the form of index plate 33 and the same is mounted on an axle 41 that is disposed on the axial center 37. Said axle is affixed to and extends from swivel 11 and the body 42 of said head is rotationally mounted thereon. The outer end of axle 41 is threaded for a clamp nut 43 that serves to firmly lock the head 13 to the swivel and the index plate 33.

The head body 42, in the present case, is formed with a tool- or work piece-holding portion 44 that is shown as having a central rib or land 45 that extends transversely of axle 41 and with two flanking tool-receiving seats 46 and 47 on either side of said rib, as best seen in Figs. 1 and 2. Each seat is defined by a sloping face 48 at a shallow angle to axle 41 and a sloping face 49 normal to face 48 and the faces 48 and 49 being opposite on both sides of rib 45.

Each seat 46 and 47 is designed, as above, to hold a square- or rectangular-sectioned tool bit 16 canted so that the upper surface thereof is at the same angle as face 48. With which it is engaged, with respect to the horizontal.

The head locating or indexing means 14 embodies a pin 50 that extends through a longitudinal bore 51 and is provided at its inner end with a reduced portion 52 that is adapted to enter one of the index apertures 36. A handle part 53 on the outer end of said pin 50 may be used to manipulate the same. After angular adjustment of head 13, for instance, as in Fig. 4, the nut 43 may be tightened to lock the assembly.

The means 15 comprises a tool or work piece clamp 54 that is provided with clamp plates 55 that overstand seats 46 and 47 and engage the upper faces or portions of said tools. Said clamp 54 has studs 56 affixed thereto and the same extend through holes 57 in the head on each side of and transverse to axle 41. Nuts 58, engaged with threads on said studs, draw said clamp 54 into clamping position.

It will be clear from the foregoing that a tool 16 can be presented to the grinding wheel 19 at any desired angle between zero and ninety degrees, Figs. 3 and 4 being two of such positions. Since the tool is held at a transverse angle, as in Fig. 2, the grinding tool 19 will grind a face 59 on said tool that is other than normal to any face of the tool bit shown. By clamping the bit first in one seat and then in the other, the tool can be ground as shown in Fig. 4 to cut conventional V-threads. Grinding one face 59 on the bit, produces a tool to cut buttress threads.

Although the seats provided effectively locate rectangular sectioned tool bits, the same can accommodate round-sectioned stock and other forms. Therefore, the present holder may mount boring bars, etc.

In the modification of Figs. 5, 6 and 7, the head 13 is utilized to mount a fixture 65 more particularly designed to hold a twist drill 66 in position to have the end 67 thereof re-ground or sharpened. Some slight variations in the form of said head may be required, as indicated by the asymmetrical arrangement of the studs 68 that are counterparts of studs 56, but which, in this case, affix a mounting plate 69 on head 13. Since the end of a twist drill includes a 118° angle, provisions in the location of apertures 36 may be made to enable location of the drill end 67 accordingly.

Said drill 66 is carried by a body 70 in which the same is clamped, as by means 71 and which is connected to plate 69 by a pivot 72 enabling relief adjustment of the drill transverse to the adjustment of head 13. Said relief adjustment can be made and locked by the means 73.

To insure location of both cutting faces of drill end 67 in the same positions when being ground, a locating finger 74, adjustably carried by body 70, is arranged to engage in the spiral grooves of the drill.

It will be clear that said drill represents similar tools, such as end mills, and that the head 13 may be adjusted to give the character desired of the end 67.

In the modification of Fig. 8, the head 13 is shown as mounting a fixture 80 that is adapted to mount a work piece such as a circular saw 81, or the like. The perimeter of said saw may be presented to a grinding or machining tool at any desired angle as explained above. Similarly, the head 13, as shown in Fig. 9, may mount a mounting plate 85 which, by means of clamps 86, may hold a tool such as chisel 87 in position to have its end 88 ground to the angle desired.

While the foregoing has illustrated and described what is now contemplated to be the best mode of carrying out the invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. In a tool holder, a swivel rotatable about a vertical axis, an axle extending horizontally from said swivel, an index plate passing over said axle and adjustably attached to said swivel, a head mounted on said axle and adapted to be indexed by said index plate, a tool-mounting portion provided on said head, said portion comprising two tool-receiving seats on opposite sides of a rib that is transverse to said axle, and means extending through said head to clamp a tool in each of said seats.

2. A tool holder comprising a base provided with a vertically disposed post secured thereto, said post being provided with screw threads in the part thereof adjacent the base, a nut engaged with said threads and adjustable thereon, a swivel mounted on said post and supported by said nut, said swivel being rotatable in a horizontal plane, an axle extending horizontally from said swivel, an index plate passing over said axle and adjustably attached to said swivel, a tool holding head mounted on said axle and adapted to be indexed by said index plate, and means on said axle to lock said head in an indexed position.

3. A tool holder according to claim 2: a rib on said tool holding head transverse to said axle, said rib separating two tool seats, and means extending through said head to clamp a tool in each of said seats.

4. A tool holder comprising a base with a vertically disposed post, said post being provided with screw threads in the part thereof adjacent said base, a nut engaged with said threads, a swivel freely fitted on the upper end of and rotatable around said post in a horizontal plane, said swivel being moved vertically by adjustment of said nut, an axle extending laterally outwardly from said swivel, an index plate passing over said axle and adjustably attached to said swivel, a tool holding head mounted on said axle, and means on said head adapted to index said head in respect to said index plate.

5. A tool holder comprising a base with a vertically disposed post, said post being provided with screw threads in the part thereof adjacent said base, a nut engaged with said threads, a swivel freely fitted on the upper end of and rotatable around said post in a horizontal plane, said swivel being moved vertically by adjustment of said nut, an axle extending laterally outwardly from said swivel, an index plate passing over said axle and adjustably attached to said swivel, a tool holding head mounted on said axle, means on said head adapted to index said head in respect to said index plate, and means on said axle to lock said head in an indexed position.

6. A tool holder according to claim 5: a rib on said tool holding head transverse to said axle, said rib separating two tool seats, and means extending through said head to clamp a tool in each of said seats.

7. In a tool holder, a swivel rotatable about a vertical axis, an axle affixed to and extending horizontally outwardly from said swivel, an index plate passing over said axle and adjustably attached to said swivel, a head rotatably mounted on said axle and adapted to be indexed in respect to said index plate, a tool-mounting portion provided on said head, and means extending through said head to clamp a tool thereto.

8. In a tool holder, a swivel rotatable about a vertical axis, an axle affixed to and extending horizontally outwardly from said swivel, an index plate passing over said axle and adjustably attached to said swivel, a head rotatably mounted on said axle and adapted to be indexed in respect to said index plate, a tool-mounting portion provided on said head, and means on said head adapted to index said head in respect to said index plate.

9. In a tool holder according to claim 8: said index plate having a plurality of accurately spaced indexing apertures therein, and said indexing means being adapted to engage said apertures.

10. In a tool holder, a swivel rotatable about a vertical axis, an axle affixed to and extending horizontally outwardly from said swivel, an index plate passing over said axle and adjustably attached to said swivel, a head rotatably mounted on said axle and adapted to be indexed in respect to said index plate, means on said axle to lock said head in an indexed position, a rib separating two tool seats, and means extending through said head to clamp a tool in each of said seats.

11. In a tool holder, a swivel rotatable about a vertical axis, an axle affixed to and extending horizontally outwardly from said swivel, an index plate passing over said axle and adjustably attached to said swivel, a head rotatably mounted on said axle and adapted to be indexed in respect to said index plate, means on said head adapted to index said head in respect to said index plate, means on said axle to lock said head in an indexed position, a rib on said tool holding head transverse to said axle, said rib separating two tool seats, and means extending through said head to clamp a tool in each of said seats.

12. In a tool holder according to claim 11: said index plate having a plurality of accurately spaced indexing apertures therein, and said indexing means being adapted to engage said apertures.

References Cited in the file of this patent

UNITED STATES PATENTS

| Number | Name | Date |
|---|---|---|
| 96,426 | Hardenbergh | Nov. 2, 1869 |
| 510,817 | Passmore | Dec. 12, 1893 |
| 676,413 | Boys | June 18, 1901 |
| 698,521 | Kneip | Apr. 29, 1902 |
| 765,198 | Robinson | July 19, 1904 |
| 1,048,173 | Kaaumoana | Dec. 24, 1912 |
| 1,638,086 | Carter | Aug. 9, 1927 |
| 1,807,999 | McMurtry | June 2, 1931 |
| 2,324,025 | Revell | July 13, 1943 |
| 2,324,608 | Walling | July 20, 1943 |
| 2,430,984 | Hopkins | Nov. 18, 1947 |
| 2,452,988 | Brown | Nov. 2, 1948 |
| 2,478,026 | Thorell | Aug. 2, 1949 |
| 2,583,408 | Black | Jan. 22, 1952 |
| 2,594,574 | Marsden | Apr. 29, 1952 |